G. A. KINDER.
BREAD SLICING MACHINE.
APPLICATION FILED NOV. 26, 1907.
923,125.
Patented May 25, 1909.
6 SHEETS—SHEET 1.
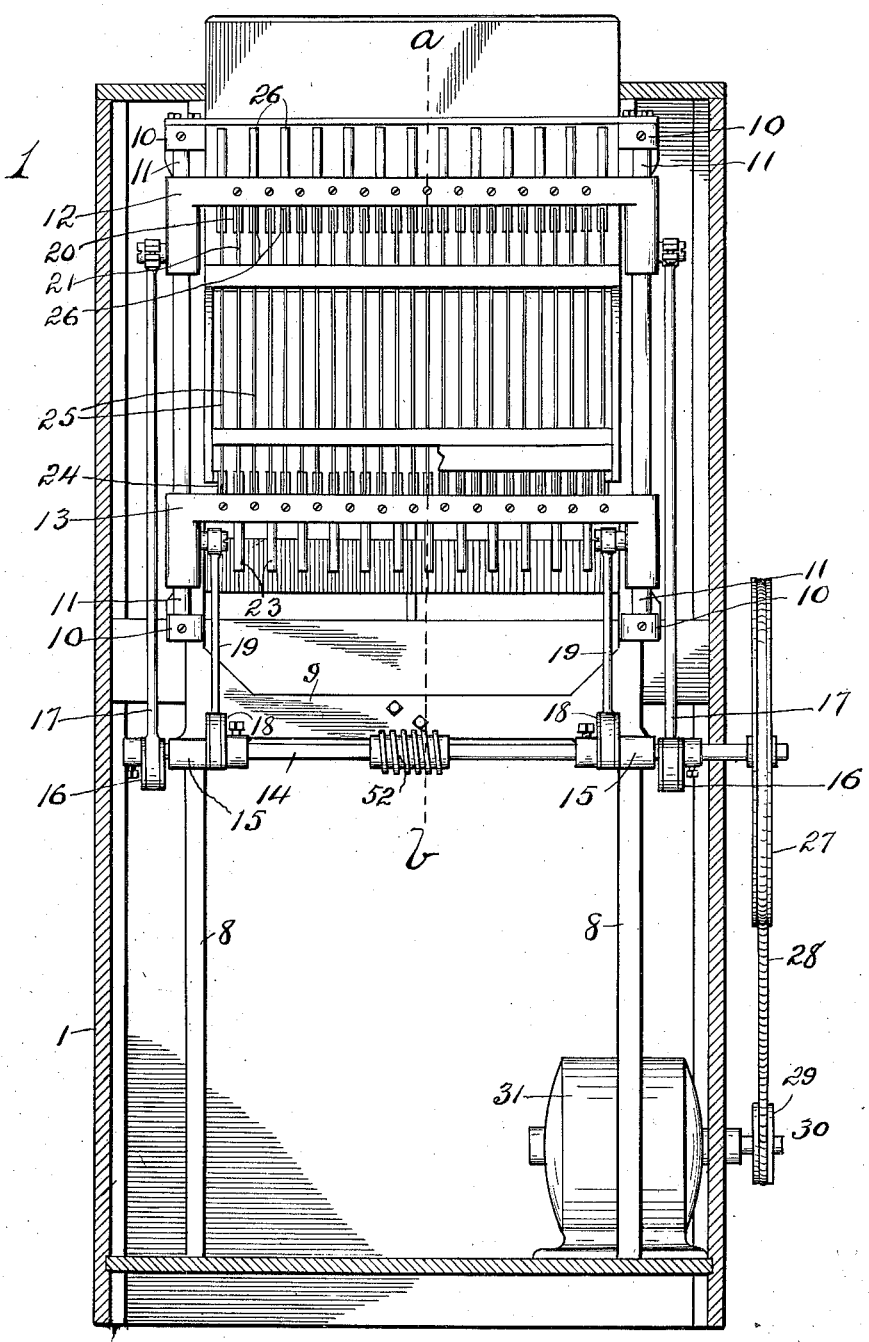
WITNESSES:
R. E. Hamilton
E. B. House
INVENTOR.
Garrett A. Kinder
BY
Warren D. House
His ATTORNEY.

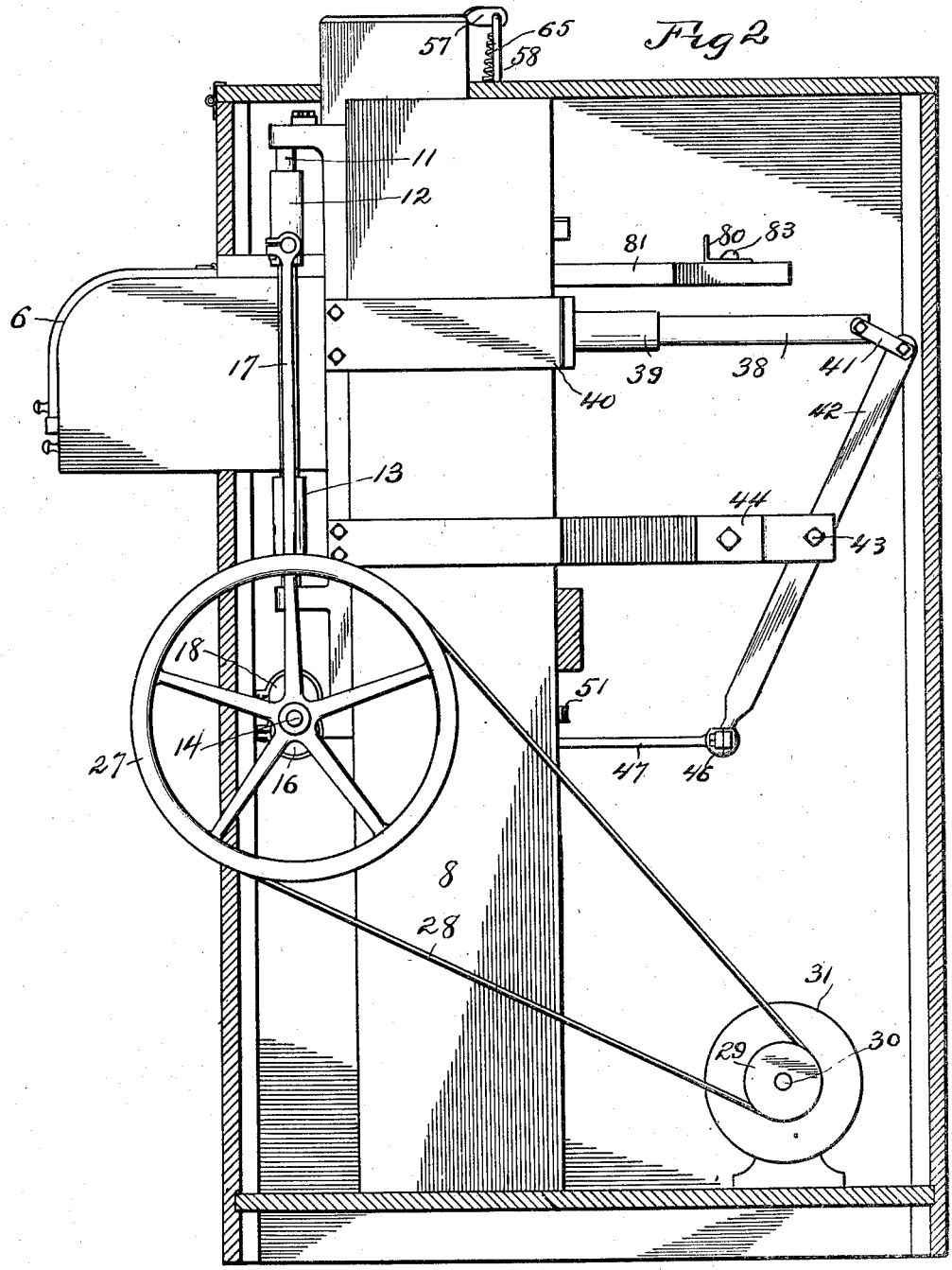

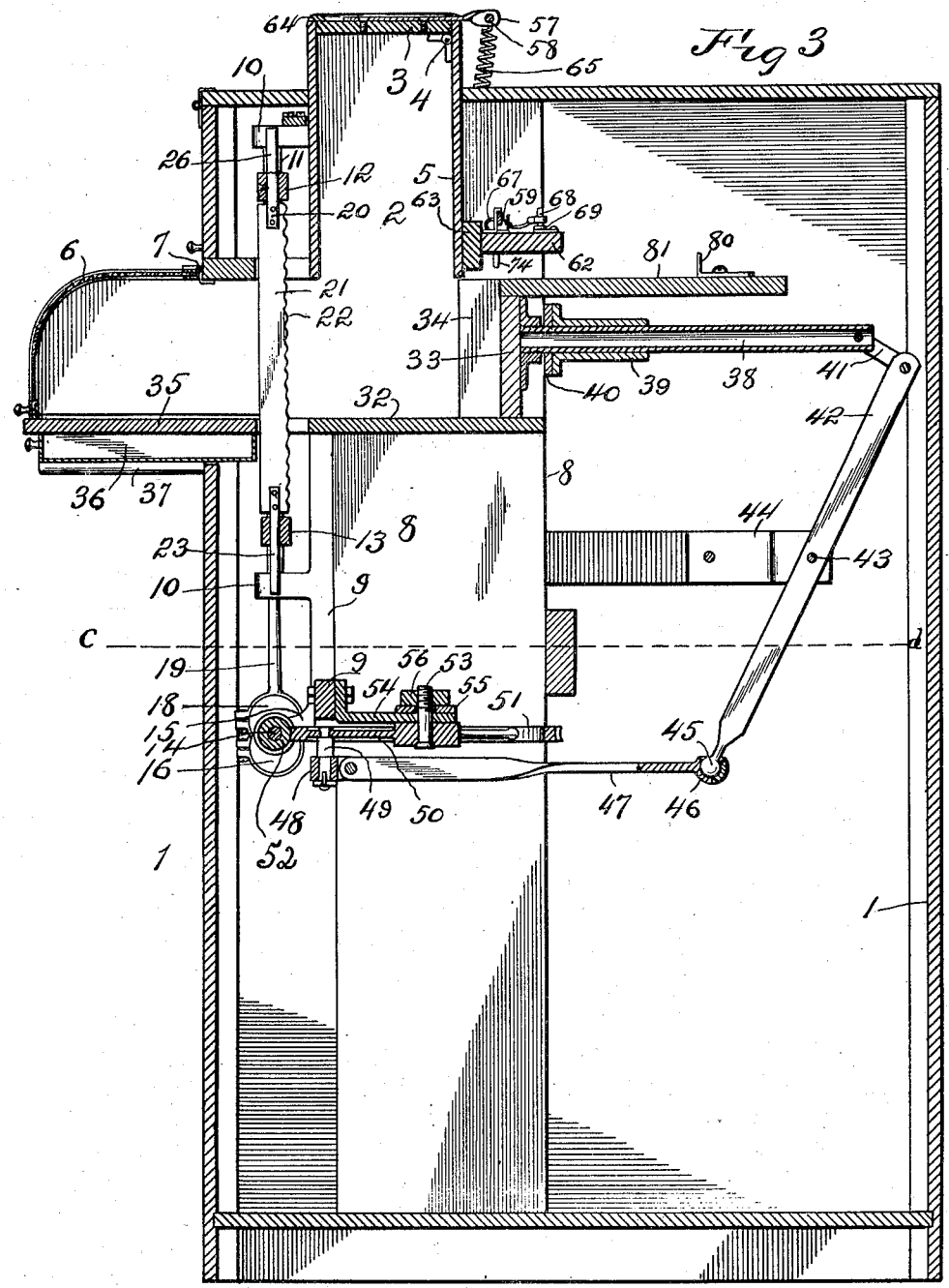

G. A. KINDER.
BREAD SLICING MACHINE.
APPLICATION FILED NOV. 26, 1907.
923,125.
Patented May 25, 1909.
6 SHEETS—SHEET 4.
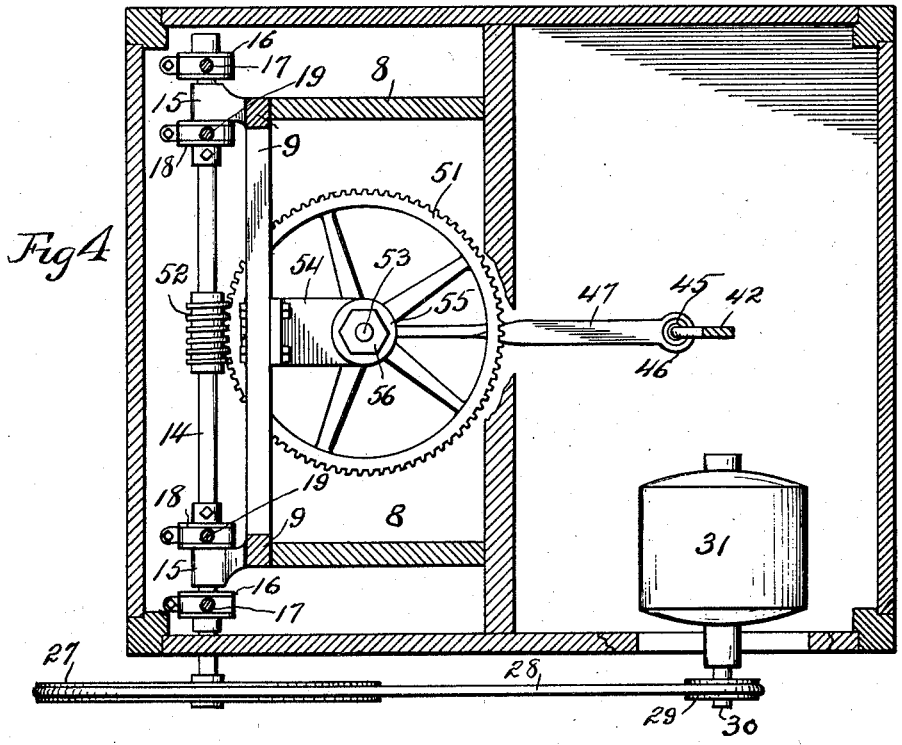
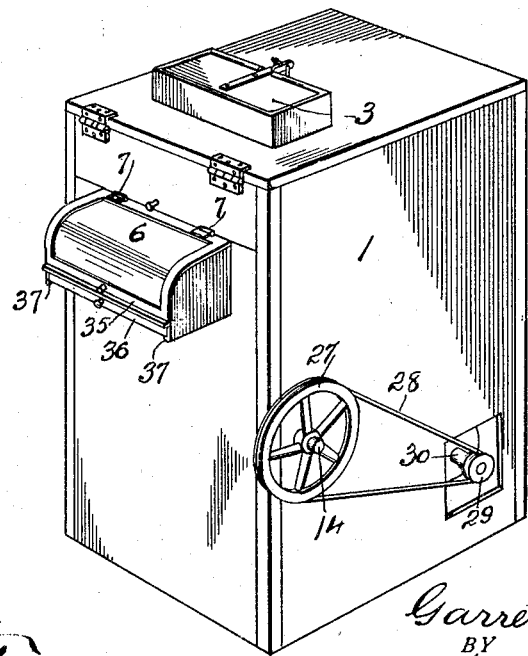
WITNESSES:
R E Hamilton
E. B House
INVENTOR.
Garrett A. Kinder
BY
Warren L. House
His ATTORNEY.

G. A. KINDER.
BREAD SLICING MACHINE.
APPLICATION FILED NOV. 26, 1907.
923,125.
Patented May 25, 1909.
6 SHEETS—SHEET 5.
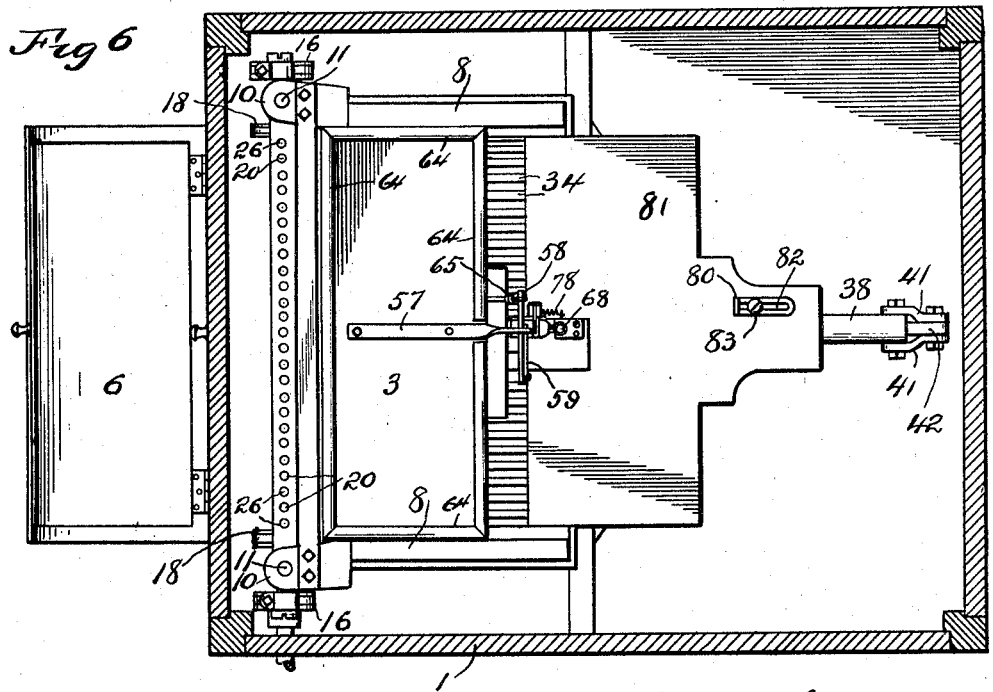
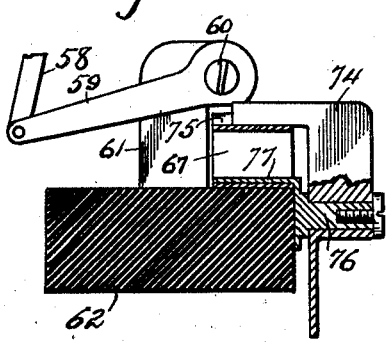
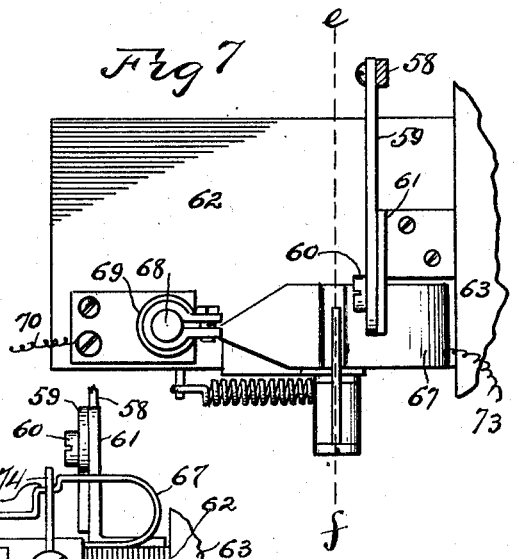
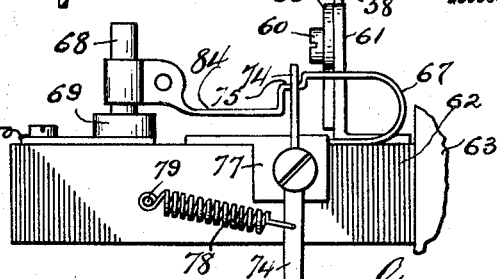
WITNESSES:
R. L. Hamilton
E. B. House
INVENTOR.
Garrett A. Kinder
BY Warren D. House
His ATTORNEY.

G. A. KINDER.
BREAD SLICING MACHINE.
APPLICATION FILED NOV. 26, 1907.
923,125.
Patented May 25, 1909.
6 SHEETS—SHEET 6.
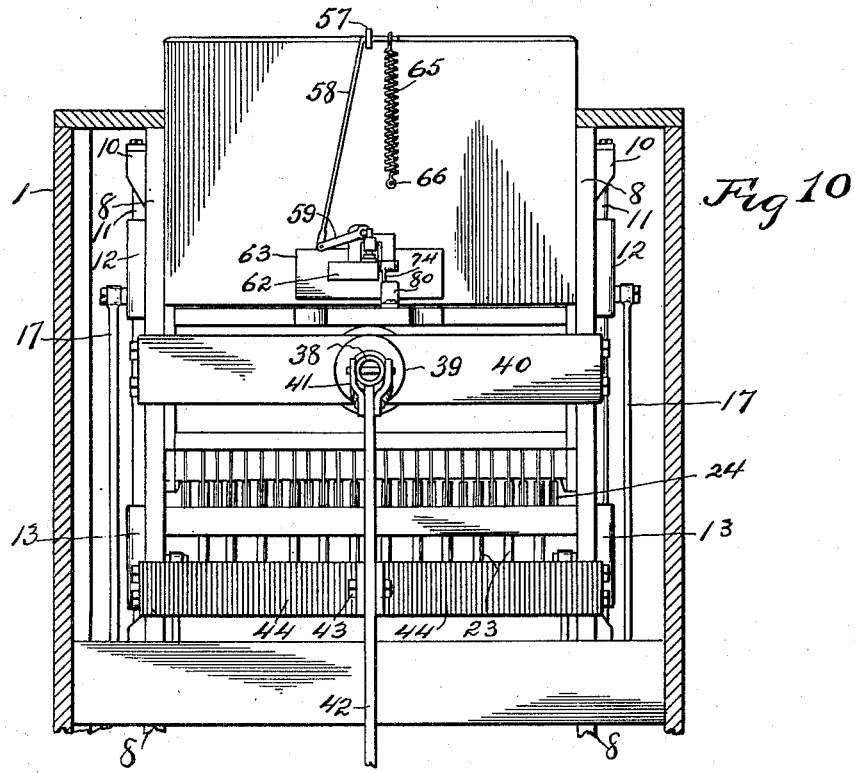
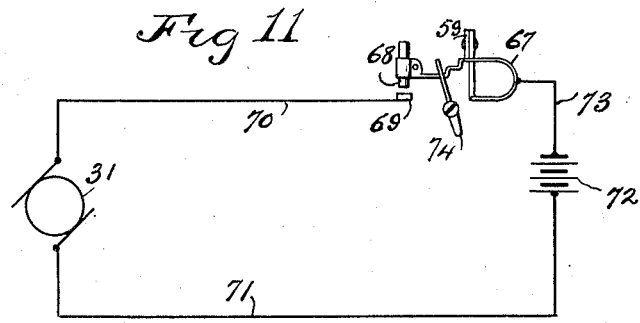
WITNESSES:
R.L. Hamilton
E. B. House
INVENTOR.
Garrett A. Kinder
BY
Warren D. House
His ATTORNEY.

UNITED STATES PATENT OFFICE.

GARRETT A. KINDER, OF KANSAS CITY, MISSOURI, ASSIGNOR, BY DIRECT AND MESNE ASSIGNMENTS, OF ONE-EIGHTH TO ROBERT LEWIS AND SEVEN-EIGHTHS TO NEWTON COLLINS AND DON C. KINNAMAN, OF ST. JOSEPH, MISSOURI.

BREAD-SLICING MACHINE.

No. 923,125.     Specification of Letters Patent.     Patented May 25, 1909.

Application filed November 26, 1907. Serial No. 404,001.

*To all whom it may concern:*

Be it known that I, GARRETT A. KINDER, a citizen of the United States, residing at Kansas City, in the county of Jackson and State of Missouri, have invented certain new and useful Improvements in Bread-Slicing Machines, of which the following is a specification.

My invention relates to improvements in bread slicing machines.

The object of my invention is to provide a bread slicing machine by which loaves of bread may be quickly and easily divided into symmetrical slices of even thickness.

Another object of my invention is to provide mechanism by which the slicing mechanism is automatically started and stopped in its operation.

Another object of my invention is to provide, in combination with slicing mechanism, an inclosing casing in which the sliced bread is retained until it is required for use.

Other novel features of my invention are hereinafter fully described and claimed.

In the accompanying drawings illustrative of my invention—Figure 1 is a view partly in front elevation and partly in vertical section of my improved bread slicing machine. Fig. 2 is a side elevation of the machine, the casing being shown in vertical section. Fig. 3 is a central vertical sectional view taken on the dotted line *a—b* of Fig. 1. Fig. 4 is a horizontal section on the dotted line *c—d* of Fig. 3. Fig. 5 is a perspective view of the machine. Fig. 6 is a top view of the machine, with a portion of the casing shown in horizontal section. Fig. 7 is a top view of a portion of the circuit closing mechanism. Fig. 8 is a vertical sectional view on the dotted line *e—f* of Fig. 7. Fig. 9 is an elevation view of the mechanism shown in Fig. 7. Fig. 10 is a view partly in rear elevation and partly in vertical section of the upper portion of the machine. Fig. 11 is a diagrammatic view of the electric circuit in which is included the motor which actuates the slicing mechanism.

Similar characters of reference denote similar parts.

1 is a rectangular casing having in its upper end and adjacent its forward side a right angled chamber 2, shown in Fig. 3, the upper end of the vertical portion of which is provided with an inlet through which the loaves of bread are inserted, said inlet being normally closed by means of a horizontal closure or door 3, secured by a hinge 4 to the inner side and upper end of the rear vertical wall 5 of the chamber 2.

The forward end of the horizontal portion of the chamber 2 is normally closed by means of a closure or door 6 secured by hinges 7 to the forward side of the casing 1. At opposite sides of the chamber 2 and parallel with the sides of the casing 1, are two vertical plates 8, the upper and lower ends of which are secured respectively to the top and bottom of the casing 1. Secured to the forward edges of the plate 8 is a vertical U-shaped plate 9, each vertical arm of which is provided with two forwardly extending horizontal projections 10, disposed one above the other. Two vertical parallel guide bars 11 have their upper and lower ends secured respectively in vertical holes provided in the upper and lower projections 10.

Vertically slidable on the bars 11 are two horizontal cross heads 12 and 13, disposed one above the other and reciprocative simultaneously in opposite directions by the following described mechanism.

A horizontal rotary shaft 14 is mounted in holes provided in two projections 15, which extend forward horizontally from the lower end of the plate 9. Rigidly secured upon the shaft 14 are two eccentric disks 16, pivotally mounted respectively in the lower ends of two connecting rods 17, the upper ends of which are pivotally connected respectively to opposite ends of the cross head 12. Two similar connecting rods 19, are pivotally connected at their upper ends to opposite ends of the cross head 13. The lower ends of the connecting rods 19 encircle and are pivotally mounted respectively upon two eccentric disks 18 rigidly secured upon the shaft 14 and disposed thereon in positions diametrically opposite the eccentric disk 16.

By the above it will be seen that when the shaft 14 is rotated the cross heads 12 and 13 will be moved simultaneously in opposite directions upon the guide bars 11. Secured rigidly in vertical holes provided in the cross head 12 are a series of pins 20, the lower ends of which are rigidly secured to the upper ends of a series of vertical slicing devices, comprising preferably thin vertical parallel blades 21, the rear edges 22 of which are preferably serrated cutting edges, similar in form to the cutting edges provided on ordinary bread knives. A series of vertical pins 23 are vertically slidable in holes provided therefor in the cross head 13, the upper ends of said pins being rigidly secured to the lower ends of the slicing blades 21.

The cross head 13 is provided with a series of vertical holes disposed in alternate order intermediate the pins 23. In said vertical holes are secured respectively a series of pins 24, the upper ends of which are rigidly secured to the lower ends of a series of slicing devices comprising preferably thin, parallel, vertical slicing blades 25, disposed in alternate order relative to the blades 21 and also having rear serrated cutting edges. The upper ends of the blades 25 are rigidly secured to the lower ends of a series of pins 26 which are vertically slidable in vertical holes provided therefor in the cross head 12.

From the above it will be noted that when the cross heads 12 and 13 are reciprocated by the rotation of the shaft 14, the two sets of blades 21 and 25 will be simultaneously reciprocated in opposite directions.

For the purpose of rotating the shaft 14 a pulley wheel 27 is secured thereto. A belt 28 connects the pulley wheel 27 with a pulley wheel 29 rigidly secured upon the armature shaft 30 of an electric motor 31.

Reciprocative toward the closure 6 upon the horizontal bottom 32 of the chamber 2, is a transverse follower comprising a plate 33 provided on its forward side with a series of vertical fingers 34, adapted to pass respectively between the blades 21 and 25 so as to force the loaf which has been sliced by said blades to a position intermediate the closure 6 and said blades, and upon a horizontal plate 35 which also serves as a cover for a crumb tray 36. The crumb tray 36 is disposed below the plate 35 and is slidably mounted upon horizontal forwardly extending strips 37 secured upon the inner sides of the side walls of the chamber 2.

The plate 35 is preferably horizontally slidable upon the upper side of the tray 36 whereby said plate may be withdrawn to a position in which crumbs resting on said plate may be deposited in the crumb tray 36.

I will now describe the mechanism employed to reciprocate the follower 33 at right angles to and simultaneously with the blades 21 and 25:—A horizontal member comprising preferably a tube 38 is longitudinally slidable in a bearing 39, secured to the rear side of a horizontal bar 40 which has its ends secured to the rear edges of the plates 8. The forward end of the tube 38 is rigidly secured in any desired manner to the rear side of the follower plate 33. To the rear end of the tube 38 is pivoted one end of a link 41, the other end of which is pivoted to the upper end of a lever 42, pivotally mounted upon a horizontal bolt 43, which connects two horizontal plates 44 which have their rear ends embracing opposite sides of the lever 42 and their forward ends secured to the outer sides of the plates 8 respectively. The lower end of the lever 42 is preferably provided with a spherical shaped head 45 pivotally fitted in a socket 46 provided at the rear end of a horizontal link 47, the forward end of which is pivoted to a collar 48 pivotally fitted upon a vertical pin 49 the upper end of which is rigidly secured to one of the spokes 50 of a horizontal worm wheel 51 which meshes with a worm 52 secured rigidly upon the shaft 14. The worm wheel 51 is rotatably mounted upon a vertical bolt 53 which projects through an opening provided therefor in the horizontal portion of a right angled bracket 54 the vertical portion of which is rigidly secured to the rear side of the horizontal portion of the U-shaped plate 9. Mounted upon the bracket 54 and encircling the bolt 53 is a washer 55 upon which rests a nut 56 fitted on the screw threaded upper end of said bolt 53.

From the above description it will be seen that when the shaft 14 is rotated, thus vertically reciprocating in opposite directions the blades 21 and 25, as has been described, the follower 33 will be horizontally reciprocated toward and from said blades through the intermediacy of the tube 38, links 41, lever 42, link 47, collar 48, pin 49, worm wheel 51 and worm 52.

In order that the slicing mechanism may be operated only at such times as bread is being sliced, I have provided mechanism by which the motor 31 is started into operation when the cover 3 is swung downward by the insertion into the chamber 2 of a loaf of bread. Mechanism is provided further by which, after the loaf of bread has been sliced the motor will be stopped until such time as the door 3 has been again swung downward. The mechanism for effecting the functions just described comprises the following described parts:—Referring particularly to Figs. 3, and 6 to 11, 57 denotes a horizontal plate secured to the upper side of the closure 3 and projecting to the rear of the rear wall of chamber 2. The rear end of the plate 57 is provided with a transverse hole in which is pivotally mounted the upper end of a connecting rod 58, the lower end of which is pivoted to one end of a cam lever 59, pivoted by means of a screw 60 to the vertical portion of a right angled bracket 61, the horizontal portion of which is secured upon the upper side of a block 62 of insulation material secured at its forward edge to a horizontal block 63, secured to the rear side of the rear wall of chamber 2.

Encircling the inlet of chamber 2 above the closure 3, and projecting inwardly beyond the walls of the said chamber, are four strips 64, which serve as a seat for the closure 3 when the closure is in the horizontal position shown in Fig. 3. A coil spring 65, secured at its upper end to the rod 58 and at its lower end to a pin 66 in the rear side of the rear wall of chamber 2, serves to normally retain the closure 3 in the closed position shown in Figs. 2, 3, 5 and 6. Upon the upper side of the insulating block 62 is secured one horizontal arm of a substantially U shaped spring 67, the other or upper arm of which has secured to its outer end a vertical contact 68 adapted, when the spring 67 is compressed as shown in Figs. 8 and 9, to bear upon and make electrical connection with a contact 69 secured upon the upper side of the block 62. The contact 69 is connected by a conductor 70 with one brush of the motor 31, the other brush of which, as is shown in Fig. 11, is connected by a conductor 71 with one pole of a generator, such as a battery 72, the opposite pole of which is connected by a conductor 73 with the spring 67.

As long as the spring 67 is held in the position shown in Fig. 9 with the contacts 68 and 69 electrically connected with each other, the circuit which includes the motor 31 and generator 72 will be closed and the motor will be driven by the current passing therethrough from the generator. As long as the motor is driven the blades 21 and 25 and the follower 33 will be reciprocated. The spring 67 must therefore be compressed so that the contacts 68 and 69 are against each other until the follower 33 has forced the sliced loaf upon the slidable plate 35 and past the blades 21 and 25. It is then desirable to release the spring 67, thus breaking the circuit and stopping the motor until a fresh loaf has been forced downward past the closure 3. To normally hold the spring in the position shown in Fig. 9 a right angled lever 74 has its horizontal portion normally resting in a recess 75 in the upper side of the upper arm of the spring 67. The lever 74 is pivoted upon a horizontal stud 76 projecting from the vertical side of a right angled bracket 77 the horizontal portion of which is secured upon the upper side of the lower arm of the spring
67. A coil spring 78 having one end secured to the lever 74 and the other end to a horizontal pin 79 in the block 62 serves to normally hold the lever 74 in a position such that the lower edge of the horizontal arm of the said lever will bear upon the upper side of the upper arm of the spring 67. The lower vertical portion of the lever 74 is disposed in the path of movement of the vertical portion of a right angled bracket 80 the horizontal portion of which is secured upon the upper side of a horizontal plate 81, the forward end of which is secured rigidly upon the upper edge of the follower plate 33. The horizontal portion of the bracket 80 is provided preferably with a longitudinal slot 82, in which is mounted the securing screw 83 which is secured to the plate 81. This arrangement provides means by which the bracket 80 may be adjusted toward and from the follower plate 33.

I will now describe the operation of my invention:—When a loaf of bread is inserted in the vertical portion of the chamber 2 the closure 3 will be swung downward, thus moving upward the connecting rod 58 and thereby swinging the cam lever 59 against the upper side of the upper arm of the spring 67, thus forcing the contacts 68 and 69 together and closing the circuit which includes the motor 31. At such time the follower 33 will be in the position opposite the one shown in Fig. 3, with the bracket 80 against the lower end of the lever 74, which lever at this time is forced by the said bracket 80 against the pressure of the spring 78 to a position in which the horizontal arm of the lever 74 will be swung from the recess 75 over a deeper recess 84 provided in the upper arm of the spring 67. The closure 3 having been depressed and the loaf inserted in the chamber 2, the motor 31 now being in a closed circuit will be energized and driven, thus, as already described, rotating the shaft 14 and thereby rotating the worm wheel 51 and through the intermediate mechanism, already described, causing the follower plate 33 to move backward away from the blades 21 and 25, thereby releasing the lever 74 which will be swung by the spring 78 into a position in which the horizontal arm of the lever 74 will pass into the recess 75 and rest upon and hold the upper arm of the spring 67 in the position shown in Fig. 9. As the follower plate 33 moves rearwardly the loaf of bread may be deposited upon the bottom 32 of the chamber 2. The closure 3 is then permitted to be swung to the closed position shown in Fig. 3 through the intervention of the spring 65 and rod 58. The lever 74 will now hold the spring 67 in the position shown in Fig. 9 with the contacts 68 and 69 against each other. The motor 31 in running will force the follower plate 33 forward, thereby forcing the loaf resting on the bottom 32 of chamber 2 against the cutting edges of the oppositely reciprocating blades 21 and 25. Continued forward movement of the follower 33 will eventually force the loaf of bread past the blades 21 and 25 and upon the movable plate 35. At this time the slicing blades will have divided the loaf into symmetrical slices of uniform thickness. The object of having two sets of knives moving simultaneously in opposite directions is to prevent the slices of bread from being distorted which would be the case if the knives moved all in the same direction at the same time, owing to the yielding nature of the fresh loaf of bread. When the follower has forced the loaf past the slicing blades the bracket 80 will have struck the lower end of the lever 74, and will have eventually swung the lever 74 to a position in which the horizontal portion of said lever will pass into the recess 84 of the spring 67, thereby releasing the spring 67, the upper arm of which will swing upwardly so that a separation occurs between the contacts 68 and 69, thereby breaking the circuit in which is located the motor 31 and generator 72. The circuit being broken the motor will stop running with the follower plate 33 in the forward position, that is, with the fingers 34 between the blades 21 and 25. The closure 6 may now be swung to the open position and the sliced loaf removed from the chamber 2 through the outlet which is normally closed by said closure 6. The closure 6 is preferably made of some transparent substance, such as glass, so that the operator may, at a glance, ascertain whether any sliced bread remains within the chamber 2. The parts will remain in the position last described until the closure 3 is again swung downward for the insertion of a fresh loaf of bread. When this is done the cam lever 59 will be swung against the spring 67 thereby forcing the contacts 68 and 69 against each other and once more closing the circuit containing the motor 31. The motor will again be started thereby again forcing rearward the follower plate 33 to a position in which the loaf will rest upon the bottom 32 of the chamber 2. The operation hereinbefore described will then be repeated.

Various modifications of my invention within the scope of the appended claims may be made without departing from its spirit.

Having thus described my invention, what I claim and desire to secure by Letters Patent, is:—

1. In a bread slicing machine, the combination with a plurality of slicing blades, of a follower, a motor, means actuated by the motor for moving adjacent blades simultaneously in opposite directions, means actuated by said motor for reciprocating said follower transversely to the said blades, an electric circuit in which said motor is included, a generator included in said circuit, and means for opening and closing said circuit.

2. In a bread slicing machine, the combination with a plurality of slicing blades having cutting edges, of a follower, a motor, means actuated by said motor for reciprocating said blades, means actuated by said motor for reciprocating said follower transversely to said cutting edges, and means controlled by said follower for stopping said motor.

3. In a bread slicing machine, the combination with a plurality of parallel slicing blades having cutting edges, of a follower, a motor, means actuated by said motor for reciprocating in opposite directions simultaneously adjacent blades, means actuated by said motor for reciprocating said follower transversely to said cutting edges, and means controlled by said follower for stopping said motor.

4. In a bread slicing machine, the combination with a plurality of parallel slicing blades, of a follower for forcing a loaf of bread against said blades, means for reciprocating said blades and follower, means actuated by the insertion into the machine of the loaf to be sliced for starting said reciprocating means into operation, and means for automatically stopping the operation of said blades and follower after the loaf has been forced between said blades.

5. In a bread slicing machine, the combination with a plurality of slicing blades having cutting edges, of a follower for forcing the loaf of bread against said blades, means for simultaneously reciprocating in opposite directions blades adjacent to each other, means for reciprocating said follower transversely to said cutting edges, means actuated by the insertion into the machine of the loaf to be sliced for starting the operation of the blade and follower reciprocating means, and means for automatically stopping the operation of said blades and follower after the loaf has been sliced by being forced between said blades.

6. In a bread slicing machine, the combination with a plurality of slicing devices, of a follower, a motor, means actuated by said motor for reciprocating said slicing devices, means actuated by said motor for reciprocating said follower relative to said slicing devices, an electric circuit in which said motor is included, a generator included in said circuit, means for opening and closing said circuit, and means controlled by the follower for breaking said circuit.

7. In a bread slicing machine, the combination with a plurality of slicing blades having cutting edges, of a follower, a motor, means actuated by said motor for simultaneously reciprocating in opposite directions blades adjacent to each other, means for reciprocating said follower in a direction transversely to said cutting edges, an electric circuit in which said motor is located, a generator in said circuit, means for making and breaking said circuit, and means controlled by the follower controlling the breaking of said circuit.

8. In a bread slicing machine, the combination with a casing having an inlet, of a closure for said inlet, slicing devices in said casing, means for forcing the loaf to be cut against said slicing devices, means for moving said slicing devices, and means controlled by the movement of said closure for starting the operation of said forcing and moving means.

9. In a bread slicing machine, the combination with a casing having an inlet, of a closure for said inlet, slicing devices in said casing, a follower for forcing the loaf against said slicing devices, a motor, means actuated by the motor for actuating said follower and slicing devices, an electric circuit in which the motor is located, a generator located in said circuit, means controlled by said closure for closing said circuit, means controlled by the position of said follower for breaking said circuit.

10. In a bread slicing machine, the combination with a casing having an inlet and outlet for the loaf to be sliced, of closures for said inlet and outlet, a follower for forcing a loaf toward said outlet, a plurality of slicing devices movable transversely across the path of said loaf intermediate the said inlet and outlet, means for moving said slicing devices and said follower, a movable support for the sliced bread intermediate the slicing devices and said outlet, and a crumb tray for which said movable support serves as a cover.

11. In a bread slicing machine, the combination with a casing having a passage therethrough, of inlet and outlet closures for said passage, a plurality of slicing blades disposed transversely across said passage, a follower for forcing a loaf through said passage against said slicing blades, a motor, means for reciprocating said blades and said follower at right angles to each other, an electric circuit in which said motor is located, a generator in said circuit, means by which when said closure for the inlet of said passage is moved to the open position said circuit will be closed, and means by which when the loaf has been moved past said blades, the circuit will be broken.

12. In a bread slicing machine, the combination with a reciprocating follower, of two cross heads, blades secured in two sets, one set to each cross head, the blades of the two sets being arranged in alternate order relative to each other, means for reciprocating said follower perpendicularly to said blades, means for reciprocating simultaneously and in opposite directions said two sets of blades, a motor for actuating said two reciprocating means, and means controlled by said follower for stopping the operation of said motor.

13. In a bread slicing machine, the combination with a casing having an inlet, of a closure for said inlet, a follower reciprocating in said casing, a plurality of slicing blades reciprocative perpendicularly to the direction of reciprocation of said follower, a motor, means actuated by said motor for reciprocating said blades and follower, an electric circuit in which said motor is located, a generator in said circuit, two contacts in said circuit, means for normally forcing said contacts apart, means connected with said closure by which when the closure is moved to the open position the contacts will be forced into contact with each other, releasable means for holding said contacts against each other, and means controlled by the follower for releasing said contacts from said holding means.

14. In a bread slicing machine, the combination with a casing having an inlet for a loaf, of a closure for said inlet, a plurality of blades, a follower, means for reciprocating said blades and follower at right angles to each other, means actuated by the opening movement of said closure for starting the operation of said reciprocating means, and means for automatically stopping the operation of said reciprocating means after the follower has forced the loaf to be sliced past said blades.

15. In a bread slicing machine, the combination with bread slicing means, of a motor for actuating said slicing means, and means controlled by said slicing means for controlling the operation of the motor.

16. In a bread slicing machine, the combination with bread slicing means, of an electric motor for actuating said slicing means, means for supplying current to said motor, and means actuated by the slicing means for controlling said current supplying means.

17. In a bread slicing machine, the combination with bread slicing means, of means for actuating said slicing means, means actuated by the insertion into the machine of a loaf to be sliced for starting into operation said actuating means, and means for automatically stopping the operation of said actuating means after the loaf has been sliced.

18. In a bread slicing machine, the combination with bread slicing means, of an electric circuit, an electric motor in said circuit for actuating said slicing means, means actuated by the insertion into the machine of a loaf to be sliced for closing said circuit, and means for automatically breaking said circuit after the loaf has been sliced.

19. In a bread slicing machine, the combination with bread slicing means, of electrically actuated means for operating the slicing means, means actuated by the insertion into the machine of a loaf to be sliced for starting into operation said electrically actuated means, and means for automatically stopping the operation of said electrically actuated means after the loaf has been sliced.

In testimony whereof I have signed my name to this specification in presence of two subscribing witnesses.

GARRETT A. KINDER.

Witnesses:
 E. B. House,
 J. S. McIlree.